United States Patent
Kuhl et al.

(10) Patent No.: US 8,189,745 B2
(45) Date of Patent: May 29, 2012

(54) METHOD AND SYSTEM FOR RECORDING TELEPHONE CONVERSATIONS PLACED ON HOLD

(75) Inventors: Lawrence Edward Kuhl, Waterloo (CA); Anton Epp, Breslau (CA)

(73) Assignee: Research In Motion Limited, Waterloo (CA)

( * ) Notice: Subject to any disclaimer, the term of this patent is extended or adjusted under 35 U.S.C. 154(b) by 382 days.

(21) Appl. No.: 12/504,735

(22) Filed: Jul. 17, 2009

(65) Prior Publication Data

US 2011/0013753 A1 Jan. 20, 2011

(51) Int. Cl.
- H04M 1/64 (2006.01)
- H04M 3/42 (2006.01)
- H04M 1/725 (2006.01)

(52) U.S. Cl. ..... 379/73; 379/85; 379/207.01; 455/412.1
(58) Field of Classification Search ................ 379/67.1, 379/202.01, 207.01; 455/412.1, 416, 450
See application file for complete search history.

(56) References Cited

U.S. PATENT DOCUMENTS

| | | | |
|---|---|---|---|
| 5,995,824 A | 11/1999 | Whitfield | |
| 6,496,201 B1 * | 12/2002 | Baldwin et al. | 715/753 |
| 6,876,632 B1 * | 4/2005 | Takeda | 370/259 |
| 6,978,001 B1 * | 12/2005 | Shaffer et al. | 379/202.01 |
| 7,136,630 B2 | 11/2006 | Xie | |
| 7,242,924 B2 | 7/2007 | Xie | |
| 7,289,791 B2 | 10/2007 | Xie | |
| 7,471,773 B2 * | 12/2008 | Takahashi | 379/72 |
| 2004/0116138 A1 * | 6/2004 | Greenspan et al. | 455/501 |
| 2004/0117859 A1 * | 6/2004 | Ohel | 725/146 |
| 2004/0184585 A1 * | 9/2004 | Takahashi | 379/85 |
| 2004/0190700 A1 * | 9/2004 | Cutaia et al. | 379/202.01 |
| 2006/0287000 A1 | 12/2006 | Sun | |
| 2007/0178890 A1 | 8/2007 | Sun | |
| 2007/0178934 A1 | 8/2007 | Sun | |
| 2008/0298768 A1 * | 12/2008 | Isobe et al. | 386/52 |

FOREIGN PATENT DOCUMENTS

| | | |
|---|---|---|
| EP | 1206105 | 5/2002 |
| WO | 9926393 | 5/1999 |

OTHER PUBLICATIONS

"CallRec 6.0 (for Palm OS)", http://mytreo.net/downloads/callrec,913.html, downloaded Sep. 21, 2009.
"mVoice 5", http://www.motionapps.com/mvoice/_treo700p.jsp, downloaded Sep. 21, 2009.
"SpoofApp: Caller ID Spoofing for Your Mobile Phone", http://www.spoofapp.com, downloaded Oct. 15, 2009.
European Patent Office, Extended European Search Report for EP Patent App. No. 09165756.9, Dec. 16, 2009.

* cited by examiner

*Primary Examiner* — Davetta W Goins
*Assistant Examiner* — Mohammad Islam
(74) *Attorney, Agent, or Firm* — Borden Ladner Gervais LLP; Jeffrey W. Wong

(57) ABSTRACT

A system and method for recording telephone conversations which have been placed on hold is provided. After a telephone conversation has been placed on hold, assuming that the conversation was being recorded, the call is designated to be in the background. Once a processor senses that a background call exists, a check is performed to determine if there is a downlink connection for this call. If there is, a new communication channel is opened so that the background call can be recorded and then appended to the original recording.

6 Claims, 3 Drawing Sheets

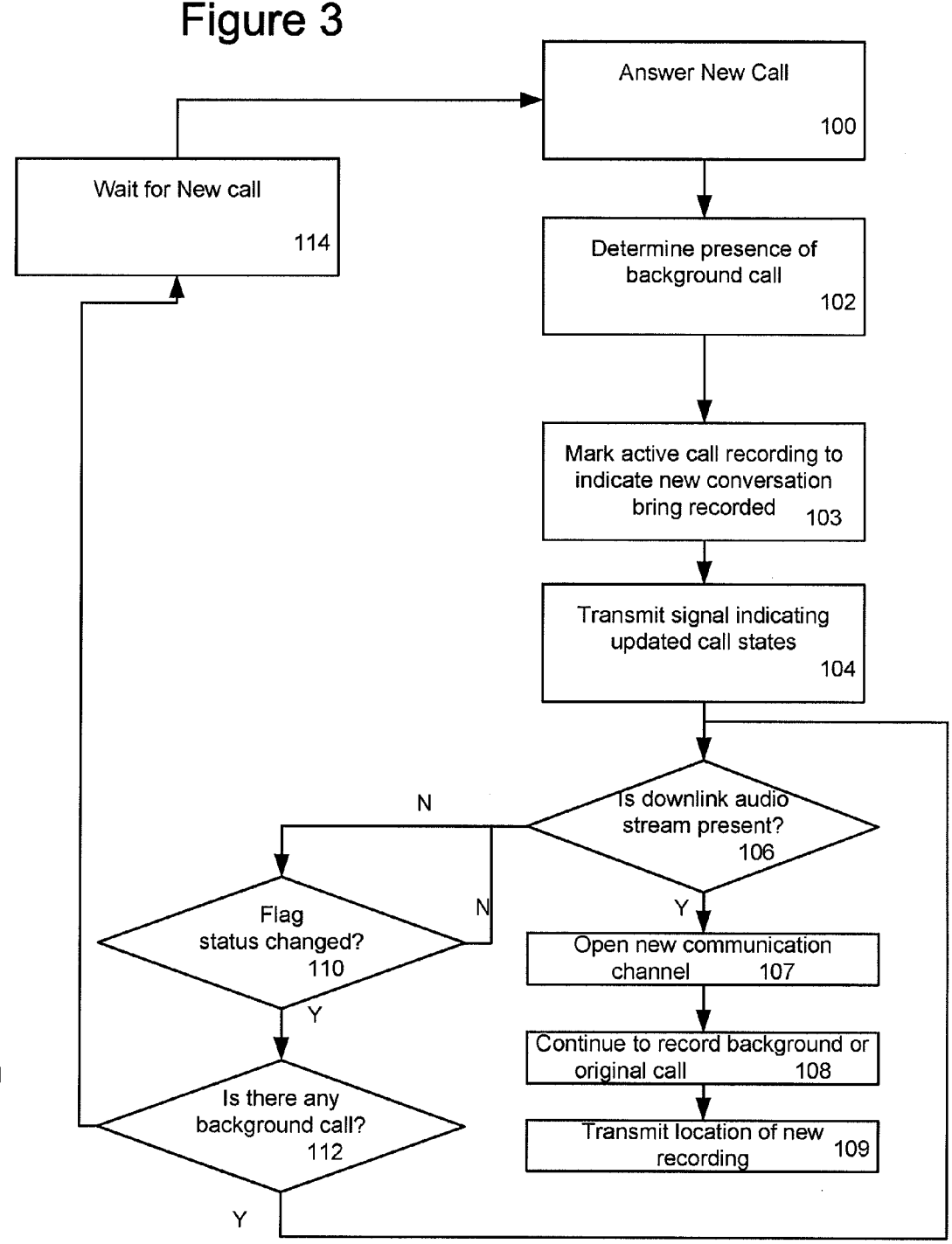

METHOD AND SYSTEM FOR RECORDING TELEPHONE CONVERSATIONS PLACED ON HOLD

FIELD OF THE DISCLOSURE

The present disclosure relates generally to recording telephone conversations. More particularly, the present disclosure relates to a method and system for recording of telephone conversations placed on hold.

BACKGROUND OF THE DISCLOSURE

Mobile communication device use has grown and continues to grow with the continued implementation of new technologies. More specifically, with the improvement of these devices, many users are now foregoing ownership of a home, or landline, telephone, and using the mobile communication device as their primary telephone. Therefore, in order for users to be comfortable with a mobile device as their primary, and possibly only, telephone, many telephony functions need to be implemented within the communication device. One such function is call waiting.

Call waiting is a telephony feature which allows a user to be in a conversation with a first party and then pause, or suspend, that conversation in order to accept an incoming call from a second party. In other words, the conversation with the first party is put on hold. The user can then flip between the two conversations or hang up one of the conversations.

Another telephony feature that is currently available is the functionality to record conversations. However, in conventional telephony, only a single conversation can be recorded at one time. More specifically, only the conversation that is active, the conversation which is being participated in by the user, can be recorded.

For instance, when a user is on a conference call and then receives a second call and puts the conference call on hold, current systems do not enable the user to continue recording the conference call because the call has been placed on hold. This can lead to the user missing important information in the conference call.

BRIEF DESCRIPTION OF THE DRAWINGS

Embodiments of the present disclosure will now be described, by way of example only, with reference to the attached Figures, wherein:

FIG. 3 is a flowchart outlining a method of recording a telephone conversation which has been placed on hold.

DETAILED DESCRIPTION

Generally, the present disclosure provides a method and system for recording telephone conversations which have been paused, suspended, or placed on hold. Assuming that a user is in the middle of a telephone conversation with a first party, when a second call comes in, the user can then receive the second call while placing the first or original call on hold. Once the original call is placed on hold, a signal is transmitted to a mobile device processor indicating that a call has been placed on hold. A check is then performed to determine if there is a downlink audio stream, or feed, to the telephone call on hold. If there is a downlink audio stream, the conversation on hold can be recorded.

In a first aspect, the present disclosure provides a method for recording background telephone conversations comprising determining that a call has been designated as being in the background; verifying that a downstream connection exists for the background call; and recording the background call if the downstream connection exists.

Other aspects and features of the present disclosure will become apparent to those ordinarily skilled in the art upon review of the following description of specific embodiments of the disclosure in conjunction with the accompanying figures.

Figure 1:
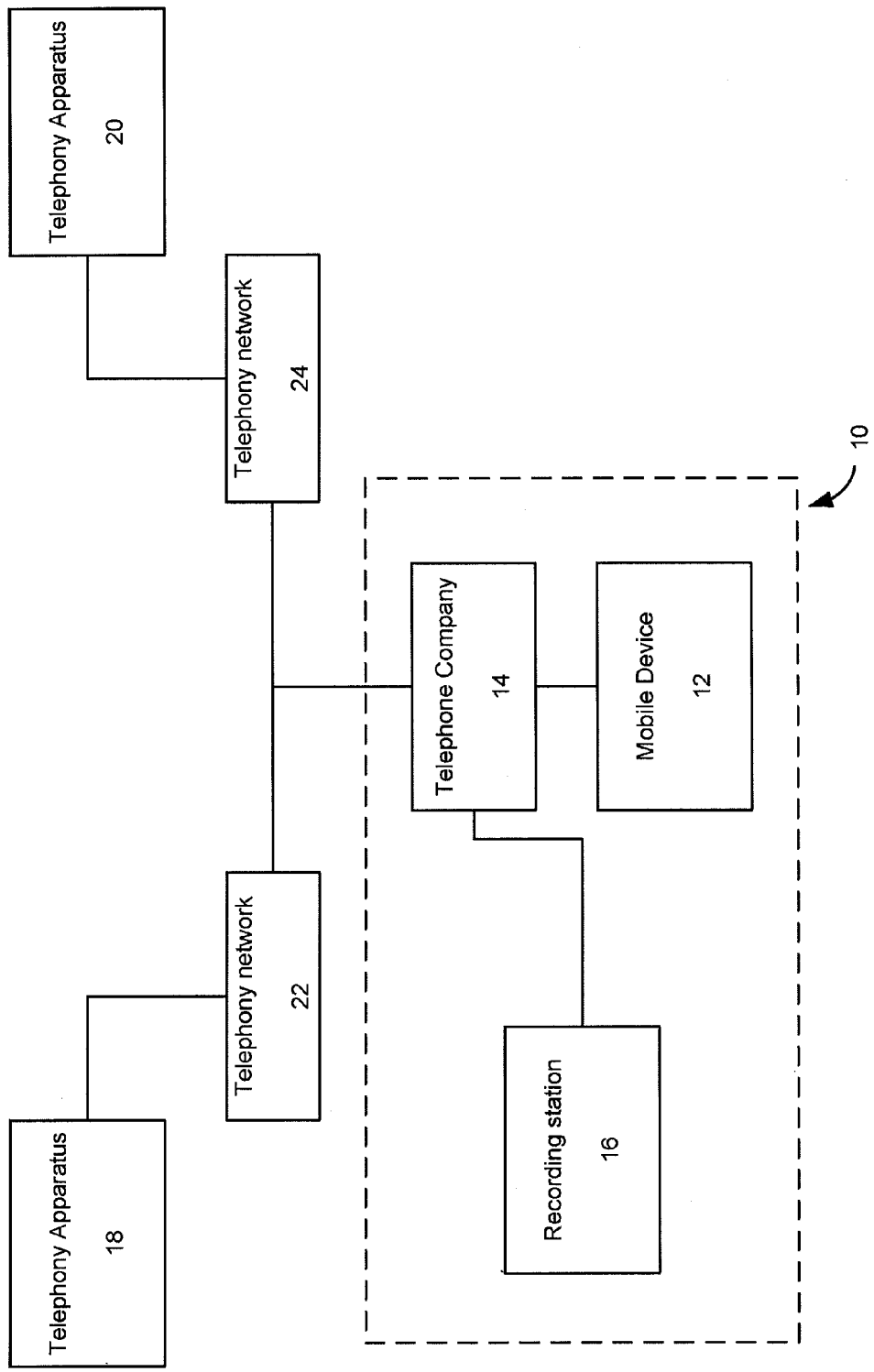
FIG. 1 is a schematic diagram of an apparatus for handling telephone conversations.

Turning to FIG. 1, a schematic diagram of a system for recording telephone conversations is shown. The system 10 includes a mobile communication device 12 which is connected to, or associated with, a telephone company 14, or telephone service provider. The telephone company 14 is connected to a recording station 16 which can be located within or remote (as shown) from the telephone company 14. Two other telephony apparatus 18 and 20 are connected to their respective telephony networks 22 and 24, and can initiate telephone conversations with the mobile communication device 12.

Examples of telephony apparatus which are capable of initiating telephone conversations include, but are not limited to, landline telephones, cordless telephones, mobile communication devices, Internet Protocol (IP) phones, videophones or softphones. Depending on the type of telephony apparatus, the associated telephony network can be one of, but not limited to, a Public Switched Telephone Network (PSTN), a Plain Old Telephone System (POTS), a Voice over IP (VoIP) system or the Internet (via an Internet Service Provider). Communication between the individual telephony networks 22 and 24 and the telephone company 14 to enable conversations will be understood by one skilled in the art.

Figure 2:
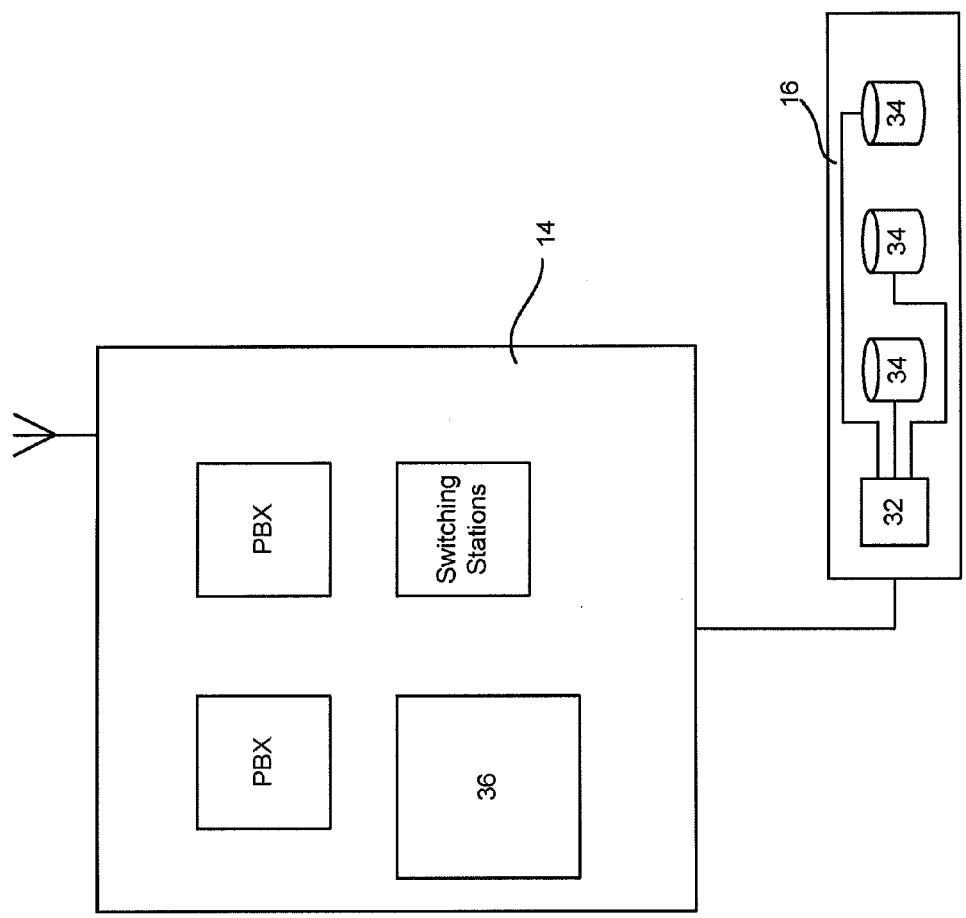
FIG. 2 is a schematic diagram of a system for recording a telephone conversation placed on hold.
Figure 2:
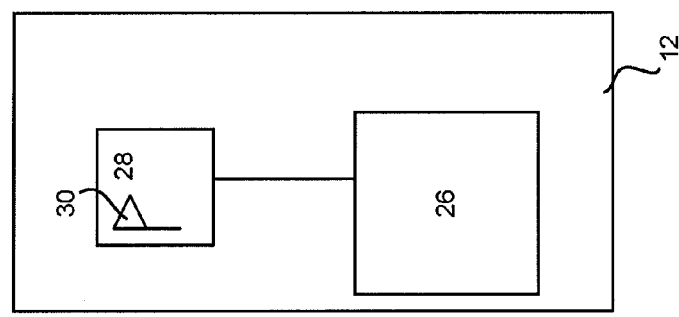

A schematic diagram of a system for recording a telephone conversation which has been placed on hold is provided in FIG. 2. The mobile communication device 12 includes a processor 26 and a database 28, the database 28 storing, among other data, a set of flags 30. The set of flags 30 can also be stored within the processor 26. One flag 30 can be used to assist in the signaling or determination of the presence of a background call, or, in other words, the presence of a call on hold. In an alternative embodiment, individual flags for each conversation can be used which indicate if the associated conversation is in the foreground or the background. While only one call can be in the foreground, there can be multiple background calls present. The use of flags to represent Boolean situations will be well understood by one skilled in the art.

The recording station 16 includes a processor 32 for communicating with the telephone company 14 and at least one database 34 for storing information or data, such as telephone conversations. The telephone company 14 includes a server 36, or processor, in communication with the device 12 and the recording station 16 to transmit and receive instructions or signals between itself and the device 12 or station 16.

Currently, when a telephone call is being recorded, the technology allows for the foreground call to be continuously recorded which means that multiple calls can be recorded in a single stream. This active call recording is performed on a main communication channel. However, current systems do not provide a method for continuing to record the foreground call if the foreground call is placed on hold to answer a second, new call.

Turning to FIG. 3, a method of recording telephone conversations which have been paused, suspended or placed on hold is shown. In operation, it is assumed that the mobile communication device 12 is connected to telephony apparatus 18, seen as a first party, on an active, or original, telephone conversation or call. The continuous recording of the active call can be seen as the active call recording. A second, or new, call, is then originated by the other telephony apparatus 20, seen as a second party, which requires the user of the mobile communication device 12 to place the original call on hold in order to answer the second call.

For the user to accept the second call, the user is required to answer the second call (step 100), typically by pressing a designated button such as a flash button although other methods of answering the second call are contemplated. Answering of the second call causes the original call to be placed on hold and designated as a background call or in the background and the second call to be designated the active call. Therefore, the processor 36 can determine when a background call is present (step 102). In one embodiment, this can be achieved with the set of flags 30 by having the flag for the original call set to background and the flag associated with the second call set to foreground. This also allows the recording of the original call to be paused and resumed later, if desired by the user.

Therefore, as the active call is transferred from the foreground to the background and the second call designated as the foreground call, the active call recording is marked to indicate there is a change in the conversation being recorded or that a new foreground conversation exists (step 103). In one embodiment, the active call recording, or data stream, is marked with a pointer indicating that the continuation of the original call recording can be found at a new location. This location is transmitted to the pointer (or mobile communication device processor) once it is determined by the server 36 (as discussed below).

Once the presence of a background call has been designated, a signal is transmitted from the mobile device processor 26 to the telephone company processor, or server, 36, indicating the change in phone call status (step 104) or presence of a call in the background. Alternatively, the server 36 can continually monitor the status of the set of flags 30 to determine when a background call is present. Although there is typically only one foreground and one background call at any moment in time, it is possible to record multiple background calls with the method disclosed within. Each call is handled separately and its recording location tracked.

Once the processor 36 recognizes that a background call exists, a check is performed to determine if there is a downstream connection, or downlink audio stream, for the background call (step 106). In one example, a downlink audio stream is a stream of audio data which can be received from the other parties in a conversation when the call is placed on hold. As the server 36 is aware of this background call (since it was the original call), it can determine if the original call included a downlink audio stream by verifying the characteristics of the call. This information can be stored at the telephone company 14 or on the mobile device 12.

If the presence of a downlink audio stream is detected, a separate communication channel can be opened between the mobile device 12 and the telephony apparatus 18 (step 107), and a signal is transmitted to the processor 32 (within the recording station 16) to continue recording the original call (step 108). The recording is stored in one of the databases 34 and tracked via known methods for future playback or processing. The storage location of this recording is then transmitted to the pointer or the processor 26 of the mobile communication device 12 (step 109) so that the entire conversation can be processed or connected when the conversation is ended. In other words, when the conversation has been completed, the multiple data streams pertaining to the original call (now the background call) can be processed and stored as a single data stream with the assistance of the various pointers or markers.

If there is no downlink audio stream detected, the original call is simply placed on hold. Depending on the technology implemented, the recording of the original call can also be paused or continued with no audio whereby no check for the downlink audio stream is required. In such an embodiment, an audio marker, instead of a pointer, is preferably inserted where the original call recording stops so that when playback of the entire active call recording occurs, the listener understands that the recording was interrupted, or paused, for a portion of time and that there are multiple conversations within the active call recording.

Continued checks are then performed to determine if the status of any of the set of flags has been changed (step 110). In one embodiment, this check is continuously performed until a change in the status of the foreground call is detected either by the mobile device processor 26 or the telephone company server 36. Therefore, when the flag for a call is changed from background to foreground, a check is performed to determine if the call is being recorded at the recording station 16. If the call was being recorded when its status was in the background, a pointer is set at the end of the recording which points to the location of the active call recording (where the conversation is now being recorded again) so that the entire conversation can be processed when the conversation is completed.

If there are only two conversations, in order to change the status of the original call, the user switches back to the original call by ending the second call or by pressing the designated button. If the user has simply pressed the designated button, the background, or original, call becomes the active call while the current active, or second, call becomes the background call and their flags reset accordingly. The recording of the original call can then be continued within the active call recording. In the preferred embodiment, for no audio recording, a second audio marker is inserted to indicate the end of the paused call and resumption of the recording. In this manner, the recording of the original call can be paused and then resumed by the user.

After the change in status of a new foreground call, a check is performed to determine if there is any background call (step 112).

If there is a new background call i.e. the flag associated with this call has just been set to designate the call as a background call, a check is performed to determine if there is a downlink audio stream present (step 106) and the method re-executes from this step. However, if there is no new background call, the user continues the original call as the active call and waits for a new call (step 114) before executing the method again when a new call arrives and is answered (step 100).

In an alternative embodiment, the method of recording can be initiated and controlled by the processor 26 in the mobile device 12 instead of the processor 36. In another embodiment, recording of both the active and the background calls can be performed in parallel as long as the necessary communication channels are available.

In another embodiment, when the second call arrives, the user can decide not to answer the call and immediately have the second call designated as a background call so that it can be recorded at a recording station or on the device itself. The call recording can be handled as discussed in FIG. 3.

In another embodiment, the mobile communication device can include a memory, such as database 28, for storing call recordings such that the processor 26 controls the method of recording and stores the background call recording in the database 28 of the communication device 12.

Embodiments of the present disclosure can be represented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention can also be stored on the machine-readable medium. Software running from the machine-readable medium can interface with circuitry to perform the described tasks.

The above-described embodiments of the present method and system for recording telephone conversations placed on hold are intended to be examples only. Alterations, modifications and variations can be effected to the particular embodiments by those of skill in the art without departing from the scope of the disclosure, which is defined solely by the claims appended hereto.

What is claimed is:

1. A method of recording background telephone conversations which are designated as a background conversation, the method comprising:

recording an original call as an active call recording in a communication device;

receiving a second telephone call at the communication device;

designating the second telephone call as a foreground call;

designating the original call as a call on hold;

verifying by a processor of the communication device, that a downlink audio stream exists for the call on hold, after detecting said original call on hold;

recording the call on hold in a database if the downlink audio stream exists and recording the second telephone call as the active call recording in the communication device;

determining a location of the database: and transmitting an address associated with the location to the processor;

indexing the active call recording by the processor to indicate that the recording of the original call has been interrupted, wherein the indexing the active call recording is done by inserting a pointer of the location address of the database.

2. The method of claim 1 wherein designating the original call comprises:

setting a flag associated with the original call from foreground to background.

3. The method of claim 1 wherein recording the call on hold comprises:

opening a separate communication channel for the call on hold; and storing a data stream associated with the call on hold in a database.

4. The method of claim 1 wherein determining that an original call has been designated comprises:

checking a flag associated with the original call, the flag indicating if the call is a foreground call or the call on hold.

5. The method of claim 1 wherein verifying that a downlink audio stream exists comprises:

retrieving the characteristics of the original call; and analyzing the characteristics of the original call.

6. The method of claim 1 further comprising:

ending the recording of the call on hold; and indexing the recording of the call on hold to indicate that recording of the call on hold has been interrupted.

* * * * *